United States Patent Office 3,849,436
Patented Nov. 19, 1974

3,849,436
CYCLIZATION OF 2-(3-ARYL - 5 - PYRAZOLYL) BENZOIC ACIDS, ESTERS AND AMIDES TO 2-ARYLPYRAZOLO[5,1-a]ISOINDOL-8-ONES
Alexander Lawrence Johnson, Wilmington, Del., assignor to E. I. du Pont de Nemours and Company, Wilmington, Del.
No Drawing. Filed Oct. 4, 1972, Ser. No. 294,897
Int. Cl. C07d 57/00
U.S. Cl. 260—310 R                3 Claims

ABSTRACT OF THE DISCLOSURE

A 2-(3-aryl-5-pyrazolyl)benzoic acid compound is converted by ring closure to a 2-arylpyrazolo[5,1-a]isoindol-8-one. The ring closure is preferably effected by contacting the starting material with a condensing agent such as thionyl chloride, phosphorus oxychloride or a lower alkanoic anhydride. The end products are useful as plant growth regulants.

BACKGROUND OF THE INVENTION

Field of the invention

This invention is to facile processes for the preparation of pyrazolo[5,1-a]isoindol-8-ones having a substituent, preferably aromatic, in the 2-position.

Prior art

A group of pyrazolo[5,1-a]isoindol-8-ones have been described in U.S. Ser. No. 97,030, filed Dec. 10, 1970, now U.S. Pat. 3,700,689 useful as plant growth regulants. They have the ring structure and are obtained by dehydrogenation of the corresponding 3,3a-dihydropyrazolo[5,1-a]isoindol-8-one which latter can be obtained by the process of U.S. 3,407,206.

It is known in organic chemistry that compounds of the structure wherein $x+y=2$ or 3 can undergo ring closure under the influence of heat or dehydrating agents such as sulfuric acid or p-toluenesulfonic acid (see Houben-Weyl, vol. 11/2, page 529 (1958)). These dehydrating reagents have been ineffective when the amino group is replaced with a hydrazine group.

DESCRIPTION OF THE INVENTION

It has now been found that the ring-closing reaction can be effected by contacting the starting material with an inorganic acid chloride, inorganic acid anhydride, organic acid chloride, a lower (up to 6 carbons) alkanoic anhydride or dicyclohexylcarbodiimide at a temperature range of 0 to 100° C. A less preferred method is the use of heat without a condensing agent at temperatures in the range of 150–250° C. at pressures of generally 0.01–1 mm. The time of reaction is generally from 15 minutes up to 8 hours.

The reaction may be represented as:

where $X^1$ is H, Cl, Br or F;
$Y^1$ is H, alkyl of 1 to 4 carbon atoms, alkoxy of 1 to 4 carbon atoms, or $CF_3$;
$n$ is a whole number 1, 2, or 3;
R is H, alkyl of 1 to 4 carbon atoms, or together with X is $-CH_2-$, $-CH_2CH_2-$, or $-CH=CH-$ connecting the 4-position of the pyrazole ring to the 2-position of the $R^1$ substituent;
$R^1$ is tert-alkyl of 4 through 12 carbon atoms, naphthyl, phenanthryl, in which X is H, halogen, alkyl of 1 to 4 carbon atoms, alkoxy of 1 to 4 carbon atoms, alkylthio of 1 to 4 carbon atoms, $NO_2$, $CH_3SO_2$, $CF_3$, CN, or carboalkoxy of 1 to 4 carbon atoms;
Y is H, halogen, alkoxy of 1 to 4 carbon atoms, or alkyl of 1 to 4 carbon atoms;
Z is H, halogen, alkoxy of 1 to 4 carbon atoms, or alkyl of 1 to 4 carbon atoms;
B is OM or $NR^2R^3$, in which
M is H, benzyl, or alkyl of 1–6 carbon atoms, optionally substituted with hydroxy or halogen; and
$R^2$ and $R^3$ are each hydrogen or alkyl of 1 to 6 carbon atoms.

Particularly preferred for the reaction are those compounds in the preceding equation where R, $X^1$ and $Y^1$ are each H, and $R^1$ is aryl, alkoxyaryl, thienyl or furyl.

Preferred condensing agents and conditions include thionyl chloride at 20–75°, phosphorus oxychloride in a tertiary amine at 20–100°, or a lower alkanoic anhydride in a tertiary amine, especially acetic anhydride in pyridine at 20–100°. When heat is used in the absence of condensing agents, it is generally at 150–250° with pressures of 0.01–1 mm. with sublimation of the desired ring closed product.

Other inorganic acid chlorides include phophorus trichloride, phosphorus pentachloride, phosphorus tribromide, phosphorus oxybromide, sulfuryl bromide, sulfuryl chloride and thionyl bromide. Inorganic acid anhydrides include those of phosphorus and sulfur, e.g., phosphorus pentoxide, phosphorus trioxide and sulfur trioxide. Organic acid chlorides include those of alkyl and aryl acids of generally up to 7 carbons, such as acetyl chloride, propionyl chloride, hexanoyl chloride, and benzoyl chloride. Useful alkanoic acid anhydrides include propionic, n-butyric, isobutyric, n-pentanoic, and n-hexanoic anhydrides.

Solvents that are particularly useful include benzene, xylene, nitrobenzene, dimethylformamide, acetonitrile, ether, tetrahydrofuran and pyridine.

It is surprising that acid reagents which are effective for other condensations, such as sulfuric acid, trifluoroacetic acid, p-toluenesulfonic acid or hydriodic acid do not bring about the desired ring closure in this invention.

While the precursors (i.e., ring opened acid, amide, or ester) are able to modify plant growth, some of the ring closed pyrazoloisoindol-8-ones are more effective for certain uses, such as reducing the rate of growth of cotton (particularly the compound of Example 5). The use of the compounds is further described in U.S. 3,407,206; 3,409,425; and 3,700,689.

SPECIFIC EMBODIMENTS OF THE INVENTION

In the following illustrative examples all parts are by weight unless stated otherwise.

EXAMPLE 1

Use of thionyl chloride

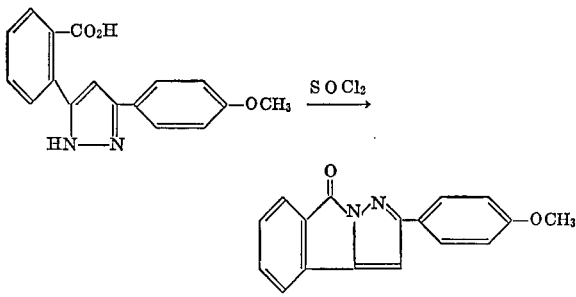

A mixture of 2-[3-(4-methoxyphenyl)-5-pyrazolyl]-benzoic acid (1.0 g.) and $SOCl_2$ (25 ml.) was stirred at 25° for 4 hr. The colorless acid dissolved immediately to form a yellow solution. The $SOCl_2$ was removed by evaporation at 50° under water pump pressure to leave a yellow solid which was recrystallized from acetone to give 2-(4-methoxyphenyl) - 8H - pyrazolo[5,1-a]isoindol - 8-one, 0.8463 g. (90%), as a yellow crystalline product, m.p. 182–185°. It was identical with the compound (by mixture m.p. and IR spectrum) prepared by 2,3-dichloro-5,6-dicyanobenzoquinone treatment of 3,3a-dihydro-2-(p-methoxyphenyl)-8H-pyrazolo[5,1-a]-isoindol-8-one.

EXAMPLE 2

Use of Thionyl Chloride

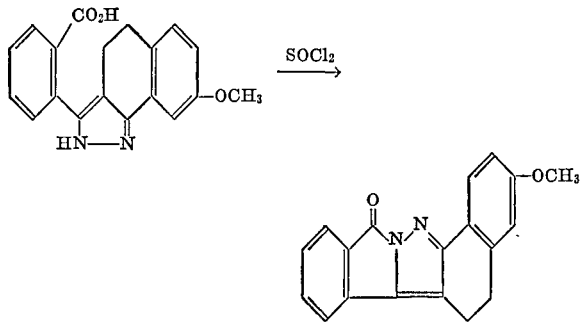

A mixture of 3-(2-carboxyphenyl)-7-methoxy-4,5-dihydro-2H-benz(g)indazole and thionyl chloride was stirred for 2 hours following the general procedure of Example 1. There was obtained a 50% yield after recrystallization of 5,6-dihydro - 3 - methoxy-11H-naphth[1',2':3,4]pyrazolo[5,1-a]-isoindol-11-one, m.p. 239–242°.

Analysis.—Calcd. for $C_{19}H_{14}N_2O_2$: C, 75.48; H, 4.67; N, 9.27. Found: C, 75.35; H, 4.74; N, 9.26.

Mixture m.p., IR, UV and NMR spectra identified it as the same compound when prepared by the procedure of U.S. 3,407,206 (reaction of phthalaldehydic acid with 6-methoxy-1-tetralone and hydrazine) followed by dehydrogenation with a molar quantity of 2,3-dichloro-5,6-dicyanobenzoquinone. This gives the above isoindolone, which can also be named as 11-methoxy-13,14-dihydrobenz(g)-7H-indazolo[2,3-a]isoindol-7-one. The latter on reaction with aqueous base followed by acidification, gives the acid as employed above in this example. Reaction of 11-methoxy - 13,14 - dihydrobenz(g)-7H-indazolo[2,3-a]isoindol-7-one with liquid ammonia gives 3-(2-carbox- amidophenyl)-7-methoxy - 4,5 - dihydro - 2H - benz(g)-indazole. This amide can serve as the starting material in the ring closure process of Example 9.

EXAMPLE 3

Use of thionyl chloride

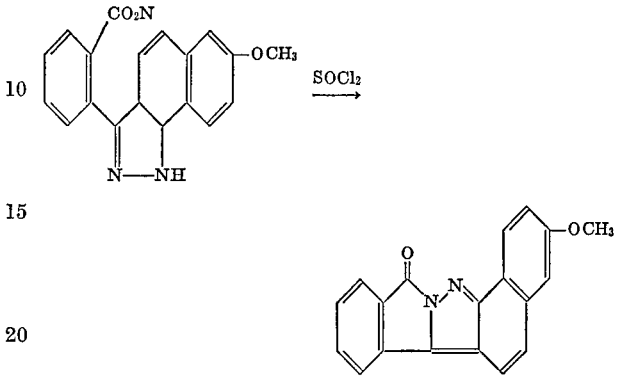

A mixture of 3-(2-carboxyphenyl) - 7 - methoxy-2H-benz(g)-indazole and thionyl chloride was stirred for 1 hour following the general procedure of Example 1. There was obtained a 67% yield after recrystallization of 3-methoxy-11H-naphth[1',2':3,4]pyrazolo[5,1 - a]isoindol-11-one, m.p. 223–226°.

Analysis.—Calcd. for $C_{19}H_{12}N_2O_2$: C, 75.99; H, 4.03; N, 9.33. Found: C, 75.72; H, 4.18; N, 9.31.

Mixture m.p., IR and UV spectra identified it as the same compound when prepared by the further dehydrogenation of the product of Example 2 with 2,3-dichloro-5,6-dicyanobenzoquinone.

EXAMPLE 4

Use of thionyl chloride

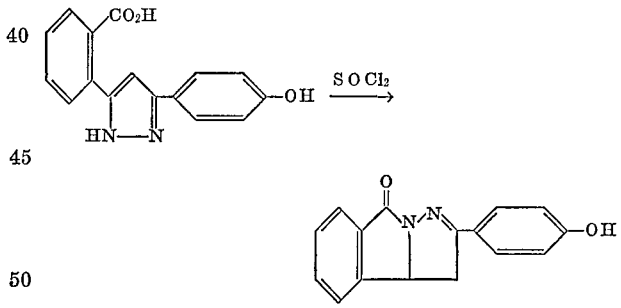

Treatment of 2-[3-(4-hydroxyphenyl) - 5 - pyrazolyl] benzoic acid with thionyl chloride for ½ hr. as described in Example 1 gave 2-(4-hydroxyphenyl)-8H-pyrazo[5,1-a]isoindol-8-one in 74% yield as yellow needles m.p. 220–223° dec. after recrystallization from 70% acetone. It has $\gamma_{max.}^{KBr.}$ 3400, 1780, 1740 and 1600 cm.$^{-1}$, $\lambda_{max.}^{THF}$ 347 ($\epsilon$ 11,000), 332 ($\epsilon$ 11,100), 286 ($\epsilon$ 20,000), 265 ($\epsilon$ 28,700) and 240 n.m. ($\epsilon$ 25,000), $^1$H n.m.r. in $(CD_3)_2SO$ vs. internal TMSi, $\delta$ =7.85–6.83 (aromatic) and 7.03 p.p.m. (pyrazole proton).

Analysis.—Calcd. for $C_{16}H_{10}N_2O_2$: C, 73.27; H, 3.84; N, 10.68. Found: C, 73.25; H, 4.18; N, 10.30.

The above substituted benzoic acid starting material was obtained when a mixture of 5 g. of 2-(4-methoxyphenyl)-8H-pyrazolo[5,1 - a]isoindole-8-one (see Example 1) and 50 ml. of constant b.p. hydriodic acid was heated at reflux for 6 hr., poured into 250 ml. water, cooled and filtered. The colorless crystalline precipitate was filtered, rinsed with aqueous $Na_2S_2O_3$, air-dried and recrystallized from a mixture of ethanol (30 ml.), DMSO (10 ml.) and water (10 ml.), yield 3.8450 g. (76%), m.p. 260–265° dec., $\gamma_{max.}^{KBr.}$ 3250, 1690 and 1610 cm.$^{-1}$, $\lambda_{max.}^{EtOH}$ 261 n.m. (ε 30,000), $^1$H n.m.r. in (CD$_3$)$_2$SO vs. internal TMSi, δ=10.91 (OH, NH, CO$_2$H), 7.73–6.83 (aromatic) and 6.75 p.p.m. (pyrazole proton).

*Analysis.*—Calcd. for C$_{16}$H$_{12}$N$_2$O$_3$: C, 68.56; H, 4.32; N, 10.00. Found: C, 68.16; H, 4.46; N, 9.75.

EXAMPLE 5

Use of thionyl chloride

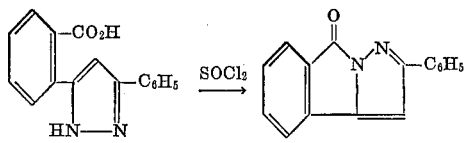

When 2-[3-(phenyl)-5-pyrazolyl]benzoic acid was treated with thionyl chloride for ¼ hr. there resulted about a 50% yield (after recrystallization from acetone) of 2-phenyl-8H-pyrazolo[5,1-a]isoindol-8-one, m.p. 145–147°.

EXAMPLE 6

Use of phosphorus oxychloride

The product of Example 1 was obtained by stirring for 3 hr. at 25° a mixture of 1.0 g. of 2-[3-(4-methoxyphenyl)-5-pyrazolyl]benzoic acid, 25 ml. of pyridine, and 0.53 g. of phosphorus oxychloride. The 2-(4-methoxyphenyl)-8H-pyrazolo[5,1,a]isoindol-8-one product was obtained in 88% yield after pouring the solution in water, filtering and recrystallizing the precipitate from acetone.

EXAMPLE 7

Use of acetic anhydride

A mixture of 5 g. of 2-[3-(4-methoxyphenyl)-5-pyrazolyl]benzoic acid, 30 ml. of pyridine, and 20 ml. of acetic anhydride was stirred at 25° C. for 1 hr. The yellow precipitate which formed during the reaction was removed by filtration, and the filtrate was diluted with water to give the ring closed product of Example 1. Recrystallization of the crude material gave a 64% yield of the compound.

Other tertiary amines which may be used instead of, or in addition to, the pyridine are trimethylamine, triethylamine, 1,4-diazabicyclo [2.2.2]octane, quinuclidine, quinoline, the 2-, 3-, and 4-picolines, the 2,3,4-, 2,3,5-, 2,3,6-, and 2,4,6-collidines, the 2,3-, 2,4-, 2,5-, 2,6-, 3,4-, and 3,5-lutidines, 1,4-dimethylpiperazine, 4-dimethylaminopyridine and N,N-dimethylaniline.

EXAMPLE 8

Use of heat

When 1 g. of 2[3-(4-methoxyphenyl)-5-pyrazolyl]-benzoic acid was heated in a subliming apparatus at 220° for 3 hours at 0.02–0.20 mm., a yellow sublimate was obtained. It was extracted with 5% NaHCO$_3$ and the residue recrystallized to give 58% yield of the product obtained in Example 1.

EXAMPLE 9

Use of heat

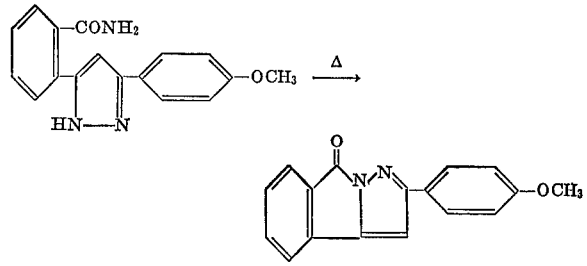

When 2-[3-(4-methoxyphenyl)-5-pyrazolyl]benzamide was heated in a subliming apparatus at 200–210° for 4 hours at 0.02–0.3 mm., a sublimate was obtained which, after purification, was 2-(4-methoxyphenyl-8H-pyrazolo [5,1-a]isoindol-8-one (81% yield).

EXAMPLE 10

Use of heat

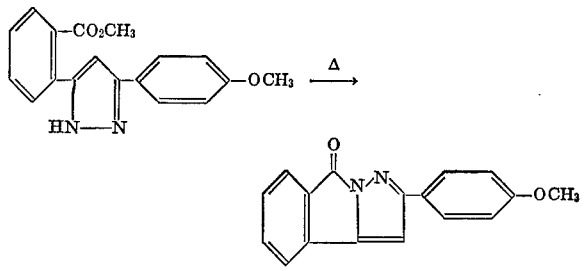

When the methyl ester of 2[3-(4-methoxyphenyl)-5-pyrazolyl]benzoic acid was heated at 200° C. for 2 hours at 0.1 mm. there was obtained a 15% yield of the compound of Example 1.

The methyl ester can be obtained by Fischer esterification of the acid starting material of Example 1 or by treating the ring-closed product of Example 1 with methanol. Amides can be prepared by reaction of the ring-closed product with ammonia.

EXAMPLE 11

Use of heat

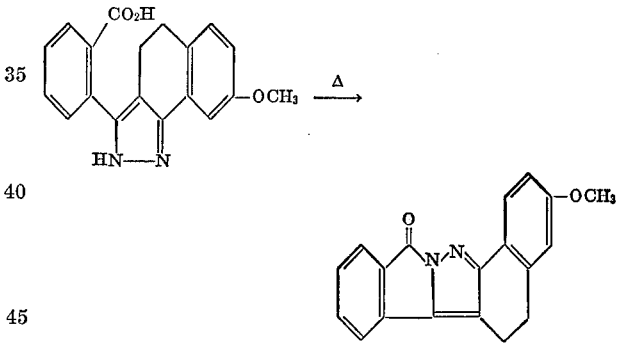

When the starting material of Example 2 was heated for 5 hours according to Example 10 about 5% yield of the product of Example 2 was obtained.

The thionyl chloride ring closure procedure is also useful for the preparation of the pyrazoloisoindoles having a heteroaromatic group in the 2-position. For example 2-[3-(2-thienyl)-5-pyrazolyl]benzoic acid, prepared by reaction of phthalic anhydride with 2-thienyl methyl ketone and hydrazine undergoes ring closure as detailed above to give 2-(2-thienyl)-8H-pyrazolo[5,1-a]isoindol-8-one,

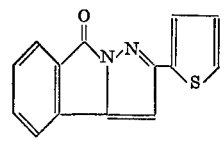

This compound prepared by another method, such as that shown in U.S. 3,407,206, followed by reaction with a molar quantity of 2,3-dichloro-5,6-dicyanobenzoquinone, gave yellow prisms m.p. 172–174°, $\nu_{max.}^{KBr.}$ 1770, 1740 cm.$^{-1}$, $\lambda_{max.}^{THF}$ 345 (ε 11,500), 330 (ε 11,600), 297 (ε 22,200), 285 (ε 23,200), 271 (ε 22,200) and 235 nm. (ε 25,400), $^1$H n.m.r. in CDCl$_3$ vs internal TMSi, δ=7.78–7.30 (aromatic), 7.03 (4-H of thiophene) and 6.50 p.p.m. (pyrazole proton).

Analysis.—Calcd. for $C_{14}H_8N_2OS$: C, 66.66; H, 3.20; N, 11.11. Found: C, 66.07; H, 3.07; N, 11.04.

In like manner 2-[3-(2-furyl) - 5 - pyrazolyl]benzoic acid, prepared from phthalic anhydride with 2-furyl methyl ketone and hydrazine undergoes ring closure as described herein to produce 2 - (2-furyl)-8H-pyrazolo[,5,1-a]-isoindol-8-one.

The embodiments of the invention in which an exclusive property or privilege is claimed are defined as follows:

1. The process of contacting a compound of the formula

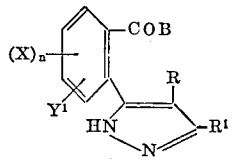

with a condensing agent consisting of a lower alkanoic anhydride in the presence of a tertiary amine selected from the group consisting of pyridine, trimethylamine, triethylamine, 1,4-diazabicyclo[2.2.2] octane, quinuclidine, quinoline, the 2-, 3-, and 4-picolines, the 2,3,4-, 2,3,5-, 2,3,6- and 2,4,6-collidines, the 2,3-, 2,4-, 2,5-, 2,6-, 3,4- and 3,5-lutidines, 1,4 - dimethylpiperazine, 4 - dimethylaminopyridine and N,N-dimethylaniline, at a temperature range of 20–100° C. from 15 minutes up to 8 hours and recovering a product of the formula

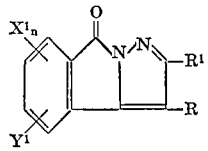

wherein
$X^1$ is H, Cl, Br or F;
$Y^1$ is H, alkyl of 1 to 4 carbon atoms, alkoxy of 1 to 4 carbon atoms, or $CF_3$;
$n$ is a whole number 1, 2, or 3;
R is H, alkyl of 1 to 4 carbon atoms, or together with X is $-CH_2-$, $-CH_2CH_2-$, or $CH=CH-$ connecting the 4-position of the pyrazole ring to the 2-position of the $R^1$ substituent;
$R^1$ is tert-alkyl of 4 through 12 carbon atoms, naphthyl, phenanthryl,

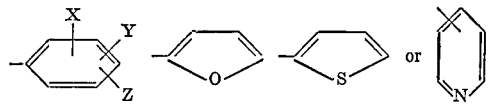

in which
X is H, halogen, alkyl of 1 to 4 carbon atoms, alkoxy of 1 to 4 carbon atoms, alkylthio of 1 to 4 carbon atoms, $NO_2$, $CH_3SO_2$, $CF_3$, CN, or carboalkoxy of 1 to 4 carbon atoms;
Y is H, halogen, alkoxy of 1 to 4 carbon atoms, or alkyl of 1 to 4 carbon atoms;
Z is H, halogen, alkoxy of 1 to 4 carbon atoms, or alkyl of 1 to 4 carbon atoms;
B is OM or $NR^2R^3$, in which
M is H, benzyl, or alkyl of 1–6 carbon atoms, optionally substituted with hydroxy or halogen; and
$R^2$ and $R^3$ are each hydrogen or alkyl of 1 to 6 carbon atoms.

2. The process of claim 1 in which the tertiary amine is pyridine and the anhydride is acetic anhydride.

3. The process of claim 2 in which the starting material is 2-[3-(4-methoxyphenyl) - 5 - pyrazolyl]benzoic acid and the product is 2-(4-methoxyphenyl) - 8H - pyrazolo[5,1-a]isoindol-8-one.

References Cited

UNITED STATES PATENTS

| | | | |
|---|---|---|---|
| 3,334,107 | 8/1967 | Griot | 260—309.6 |
| 2,555,353 | 6/1951 | Lucas et al. | 260—326.5 FL |
| 3,510,496 | 5/1970 | Aumuller et al. | 260—325 |
| 2,245,172 | 6/1941 | Zerweck et al. | 260—326.5 B |
| 3,407,206 | 10/1968 | Bousquet | 260—310 D |
| 3,409,425 | 11/1968 | Bousquet | 71—76 |
| 3,700,689 | 10/1972 | McKusick | 260—310 R |

OTHER REFERENCES

Clarke et al.: J. Amer. Chem. Soc., vol. 71, pp. 2821–5 (1949).

Gardner et al.: J. Amer. Chem. Soc., vol. 70, pp. 2906–8 (1948).

Houben-Weyl: Methoden der Organischen Chemie, 4th ed., vol. XI/2 Stickstoffverbindungen II and III, pp. 529–36, Stuttgart, Georg Thieme Verlag, 1958.

Paulen et al.: In:Zabicky et al. "The Chemistry of Amides," pp. 526–37, N.Y., Interscience-Wiley, 1970.

Smith In: Adams et al.: Organic Reactions, vol. 3, pp. 366–9 (1946).

Swan et al.: J. Amer. Chem. Soc., vol. 76, pp. 3110–13 (1954).

NATALIE TROUSOF, Primary Examiner

U.S. Cl. X.R.

71—92; 260—295 T, 295 R, 295 AM